United States Patent
Bono et al.

(10) Patent No.: US 10,181,613 B2
(45) Date of Patent: Jan. 15, 2019

(54) FUEL CELL SYSTEM AND POWER GENERATION MONITORING METHOD

(71) Applicant: TOYOTA JIDOSHA KABUSHIKI KAISHA, Toyota-shi, Aichi-ken (JP)

(72) Inventors: Tetsuya Bono, Miyoshi (JP); Satoshi Shiokawa, Okazaki (JP); Osamu Hamanoi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 430 days.

(21) Appl. No.: 14/937,631

(22) Filed: Nov. 10, 2015

(65) Prior Publication Data

US 2016/0133969 A1 May 12, 2016

(30) Foreign Application Priority Data

Nov. 12, 2014 (JP) .................................. 2014-229452

(51) Int. Cl.
*H01M 8/04537* (2016.01)
*H01M 8/04828* (2016.01)
*H01M 8/0438* (2016.01)
*H01M 8/04664* (2016.01)

(52) U.S. Cl.
CPC ..... *H01M 8/04611* (2013.01); *H01M 8/0494* (2013.01); *H01M 8/04395* (2013.01); *H01M 8/04559* (2013.01); *H01M 8/04589* (2013.01); *H01M 8/04619* (2013.01); *H01M 8/04679* (2013.01); *H01M 2250/20* (2013.01); *Y02P 70/56* (2015.11); *Y02T 90/32* (2013.01)

(58) Field of Classification Search
None
See application file for complete search history.

(56) References Cited

U.S. PATENT DOCUMENTS

| 2011/0129750 A1 | 6/2011 | Hirayama et al. |
| 2013/0095405 A1* | 4/2013 | Kawahara ......... H01M 8/04552 429/431 |

FOREIGN PATENT DOCUMENTS

JP  2013-69489  4/2013

* cited by examiner

*Primary Examiner* — Sarah A. Slifka
(74) *Attorney, Agent, or Firm* — Finnegan, Henderson, Farabow, Garrett & Dunner, LLP

(57) ABSTRACT

A fuel cell system comprising: an acquirer that acquires a total value of cell voltages of two or more cells included in a fuel cell; and a determiner that determines, when the total value is a first voltage value, abnormal power generation in which power generation by at least a part of the two or more cells is abnormal, that determines, when the total value is a second voltage value higher than the first voltage value, normal power generation in which power generation by the two or more cells is normal and that determines, when the total value is a third voltage value higher than the first voltage value but lower than the second voltage value, the normal power generation if a cathode gas is deficient or the abnormal power generation if the cathode gas is not deficient.

20 Claims, 6 Drawing Sheets

FUEL CELL SYSTEM AND POWER GENERATION MONITORING METHOD

CROSS-REFERENCE TO RELATED APPLICATIONS

This application claims priority based on Japanese Patent Application No. 2014-229452 filed on Nov. 12, 2014 the entire disclosure of which is hereby incorporated by reference.

BACKGROUND

Field

The present invention relates to the monitoring of power generation with a fuel cell.

Related Art

A fuel cell system is known that measures a voltage every multiple cells forming a fuel cell stack to monitor the state of power generation (JP2013-69489).

SUMMARY

In the conventional technology described above, since a voltage is measured every multiple cells, it is difficult to accurately grasp the voltage of each cell. Hence, it may be unclear from this measurement value whether the state of the power generation of each cell is normal or abnormal. Examples of the abnormal state of the power generation include the production of a negative voltage. Since the production of a negative voltage leads to the degradation of the cell, it is preferable to avoid it by taking measures such as an output limitation or the like. Hence, when it is unclear from the measurement value described above whether the state of the power generation is abnormal, it is determined that a negative voltage is produced, and thus it is possible to prevent a negative voltage from being overlooked.

However, in the determination method described above, even when a negative voltage is not actually produced, it may be erroneously determined that a negative voltage is produced, and hence an unnecessary output limitation may be induced. In view of the conventional technology described above, the invention of the present application has an object to enhance the accuracy of the determination.

Solution to Problem

The present invention is made so as to solve the above problem, and can be realized in aspects below.

According to one aspect of the present invention, a fuel cell system is provided. The fuel cell system includes: an acquirer that acquires a total value of cell voltages of two or more cells included in a fuel cell; and a determiner that determines, when the total value is a first voltage value, abnormal power generation in which power generation by at least a part of the two or more cells is abnormal, that determines, when the total value is a second voltage value higher than the first voltage value, normal power generation in which power generation by the two or more cells is normal and that determines, when the total value is a third voltage value higher than the first voltage value but lower than the second voltage value, the normal power generation if a cathode gas is deficient or the abnormal power generation if the cathode gas is not deficient. In this aspect, with consideration given not only to the total value but also to whether or not the cathode gas is deficient, it is possible to enhance the accuracy of the determination of the state of the power generation.

In the aspect described above, if the cathode gas is deficient, the determiner may determine whether power generation is the normal power generation or the abnormal power generation by comparing an estimation value of the cell voltage calculated as a determination value based on the total value with a deficiency-time threshold value. In this aspect, it is possible to make a determination without being affected by the state of the power generation of the other cells.

In the aspect described above, if the cathode gas is not deficient, the determiner may determine whether power generation is the normal power generation or the abnormal power generation by comparing, with a normal threshold value, a result of comparison of the total value with a representative voltage value indicating a state of power generation of the fuel cell as a determination value. In this aspect, when the cathode gas is not deficient, it is possible to make a determination with reference to the representative voltage value.

In the aspect described above, the deficiency-time threshold value may be equal to the normal threshold value. In this aspect, it is not necessary to change the threshold value depending on whether or not the cathode gas is deficient.

In the aspect described above, if the cathode gas is deficient, the determiner may determine whether power generation is the normal power generation or the abnormal power generation by comparing, with a deficiency-time threshold value, a result of comparison of the total value with a representative voltage value indicating a state of power generation of the fuel cell as a determination value. In this aspect, when the cathode gas is deficient, it is possible to make a determination with reference to the representative voltage value.

In the aspect described above, if the cathode gas is not deficient, the determiner may determine whether power generation is the normal power generation or the abnormal power generation by comparing the determination value with a normal threshold value. In this aspect, it is not necessary to change the threshold value depending on whether or not the cathode gas is deficient.

In the aspect described above, if the cathode gas is not deficient, the determiner may determine the abnormal power generation when the determination value continues to be lower than the normal threshold value for a predetermined time. In this aspect, it is possible to reduce an erroneous determination caused by disturbance.

In the aspect described above, if the cathode gas is deficient, the determiner may determine the abnormal power generation when the determination value continues to be lower than the deficiency-time threshold value for a time longer than the predetermined time. In this aspect, when the cathode gas is deficient, as compared with the case where the cathode gas is not deficient, it is unlikely that the determination result is abnormal power generation. Thus, it is possible to reduce the possibility of an erroneous determination when the cathode gas is deficient.

In the aspect described above, the result of the comparison may be a difference obtained by subtracting the representative voltage value from the total value. In this aspect, it is possible to simply calculate the determination value.

In the aspect described above, the representative voltage value may be a value obtained by averaging the cell voltages of all the cells included in the fuel cell. In this aspect, it is possible to make a determination with reference to the state of the power generation of the entire fuel cell.

In the aspect described above, the determiner may determine, based on the flow rate of the cathode gas, whether or not the cathode gas is deficient. In this aspect, it is possible to simply determine whether or not the cathode gas is deficient.

In the aspect described above, the determiner may determine, based on a generated current, whether or not the cathode gas is deficient. In this aspect, it is possible to simply determine whether or not the cathode gas is deficient.

The present invention can be realized in various aspects other than the aspects described above. For example, the present invention can be realized in aspects such as a power generation monitoring device, a power generation monitoring method, a computer program for realizing this method and a permanent storage medium in which the computer program is stored.

DESCRIPTION OF THE EMBODIMENTS

Figure 1:
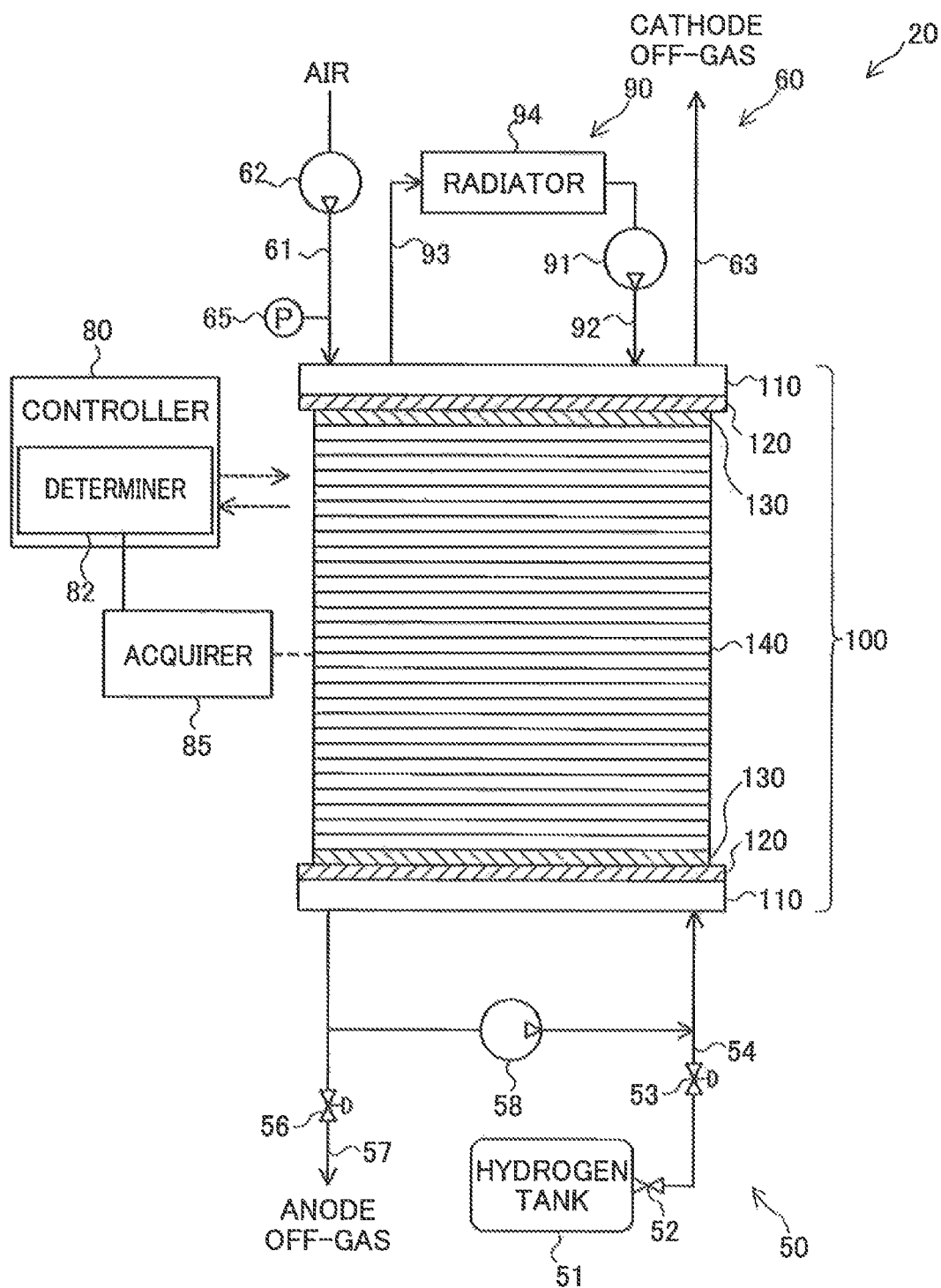
FIG. 1 is a schematic diagram of the configuration of a fuel cell system.

FIG. 1 shows a schematic configuration of a fuel cell system 20 mounted on an automobile. The fuel cell system 20 includes an anode system 50, a cathode system 60, a controller 80, an acquirer 85, a cooling system 90 and a fuel cell 100. The fuel cell 100 has a stack structure in which an end plate 110, an insulating plate 120, a current collector plate 130, a plurality of (for example, 400 sheets) cells 140, a current collector plate 130, an insulating plate 120 and an end plate 110 are stacked in layers in this order.

The anode system 50 includes a hydrogen tank 51, a tank valve 52, a regulator 53, a pipe 54, a discharge control valve 56, a discharge pipe 57 and a circulation pump 58. Hydrogen stored in the hydrogen tank 51 is supplied to the anode of the fuel cell 100 through the tank valve 52, the regulator 53 and the pipe 54.

When the discharge control valve 56 is opened, an anode off-gas (including generation water) is discharged from the discharge pipe 57. The circulation pump 58 makes the anode off-gas flow again into the pipe 54.

The cathode system 60 includes a pipe 61, an air compressor 62, a discharge pipe 63 and a pressure meter 65. The air compressor 62 compresses air sucked from the atmosphere and supplies it through the pipe 61 to the cathode of the fuel cell 100. A cathode off-gas (including generation water) is discharged through the discharge pipe 57 to the atmosphere. The pressure meter 65 measures a pressure in the vicinity of the inlet of the cathode.

The cooling system 90 includes a water pump 91, a pipe 92, a pipe 93 and a radiator 94. A cooling medium such as water is circulated by the water pump 91 through the pipe 92, the fuel cell 100, the pipe 93 and the radiator 94. The waste heat of the fuel cell 100 is discharged by the radiator 94 to the atmosphere, and thus the fuel cell 100 is cooled.

The controller 80 includes a determiner 82. The controller 80 comprehensively controls various types of operations described above, acquires necessary information for the comprehensive control and thereby controls the power generation of the fuel cell 100. The controller 80 in the present embodiment is formed with a plurality of ECUs. These ECUs communicate with each other and coordinate with each other, and thus the control by the controller 80 is realized. The acquirer 85 acquires the state of the power generation of the cells 140, and inputs it to the controller 80. The determiner 82 acquires the state of the power generation input to the controller 80.

Figure 2:
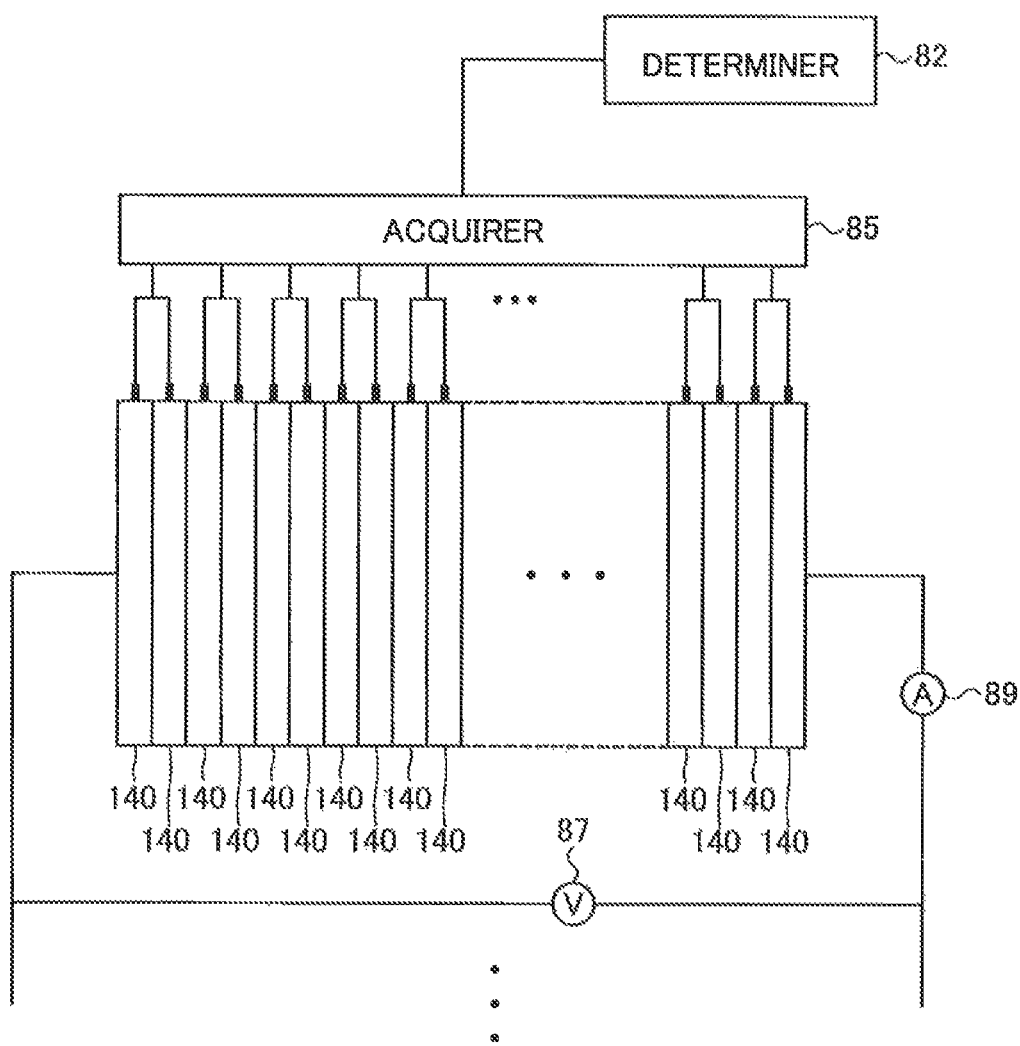
FIG. 2 is a diagram showing how an acquirer is connected to cells.

FIG. 2 shows how the acquirer 85 is connected to the cells 140. The acquirer 85 measures the total value of cell voltages in each cell group. The determiner 82 acquires the total value acquired by the acquirer 85. The cell group in the present embodiment is formed with two cells 140 adjacent to each other. The acquirer 85 configured as described above can be manufactured inexpensively as compared with a configuration in which a voltage is measured every cell 140. Hereinafter, the total value described above is referred to as a measurement voltage.

The fuel cell system 20 further includes a voltmeter 87 and an ammeter 89. The voltmeter 87 measures a generated voltage and transmits it to the controller 80. The ammeter 89 measures a generated current and transmits it to the controller 80. The controller 80 uses the value of the generated voltage and the value of the generated current for the comprehensive control.

Figure 3:
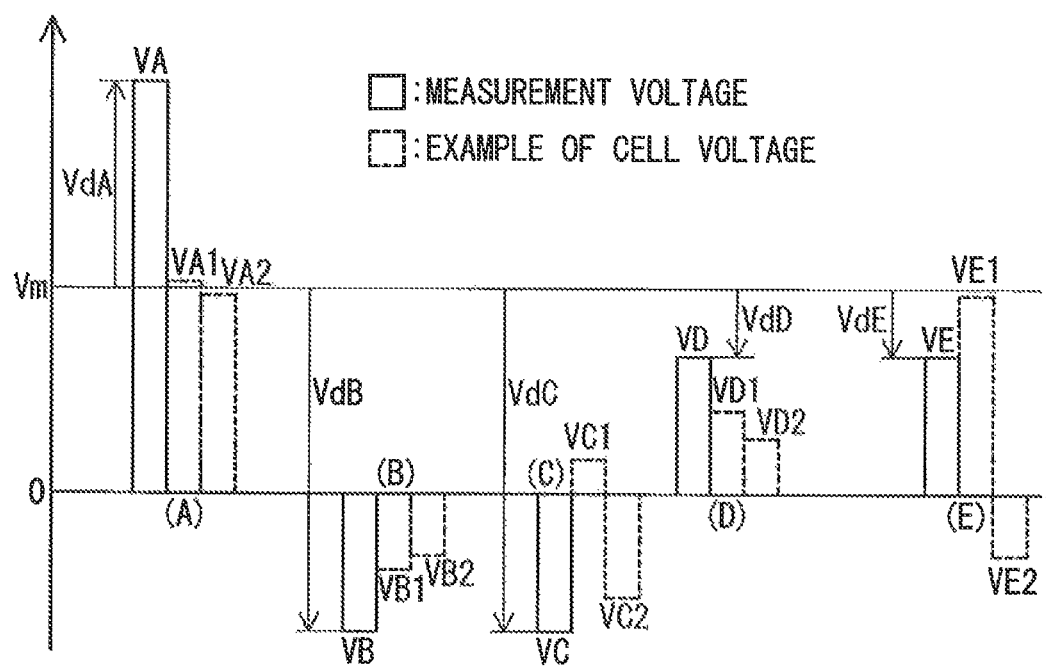
FIG. 3 is a bar graph showing a relationship between a measurement voltage and a cell voltage.

FIG. 3 is a bar graph for illustrating a relationship between a measurement voltage and the cell voltage. The (A) of FIG. 3 illustrates a case where the measurement voltage VA significantly exceeds a stack average cell voltage Vm. The stack average cell voltage Vm is a value that is obtained by dividing the measurement value by the voltmeter 87 by the number of cells 140. The stack average cell voltage Vm is a representative voltage value in the present embodiment. A determination value VdA (the determination value Vd will be described later together with FIG. 4) obtained by subtracting the stack average cell voltage Vm from the measurement voltage VA is a positive value, and is a value that approximates to the stack average cell voltage Vm. In the case of the measurement voltage VA, it is highly likely that both cell voltages VA1 and VA2 are values in the vicinity of the stack average cell voltage Vm as illustrated in the (A) of FIG. 3. The cell voltages VA1 and VA2 mean values that are estimated to be the cell voltages of the cells 140 forming a cell group which is the measurement target of the measurement voltage VA. Hereinafter, when the "VA" is replaced with "VB" or the like, the same meaning is provided.

On the other hand, measurement voltages VB and VC illustrated in the (B) and (C) of FIG. 3 are negative values, and are significantly lower than the stack average cell voltage Vm. Consequently, determination values VdB and VdC are negative values. In such a case, it is highly likely that in at least part of the cells 140, a negative voltage is produced. The (B) of FIG. 3 illustrates a case where both the cell voltages VB1 and VB2 are negative voltages, and the (C) thereof illustrates a case where the cell voltage VC1 is a positive voltage and the cell voltage VC2 is a negative voltage.

One purpose of the acquisition of the measurement voltage is to detect the cell 140 where a negative voltage is produced as described above. This is because in the cell 140 where a negative voltage is produced, degradation progresses.

Although the measurement voltages VD and VE illustrated in the (D) and (E) of FIG. 3 are positive values, they are less than the stack average cell voltage Vm. Hence, the determination values VdD and VdE are negative values. In such a case, it is difficult to immediately estimate, from the measurement voltages, whether or not a negative voltage is produced. In other words, as shown in the (D) of FIG. 3, both cell voltages VD1 and VD2 may be positive voltages whereas as shown in the (E) of FIG. 3, a cell voltage VE1 is a positive voltage but a cell voltage V2 may be a negative voltage.

With consideration given to the relationship between the measurement voltage and the cell voltage described above, as processing for controlling power generation, power generation monitoring processing will then be described.

Figure 4:
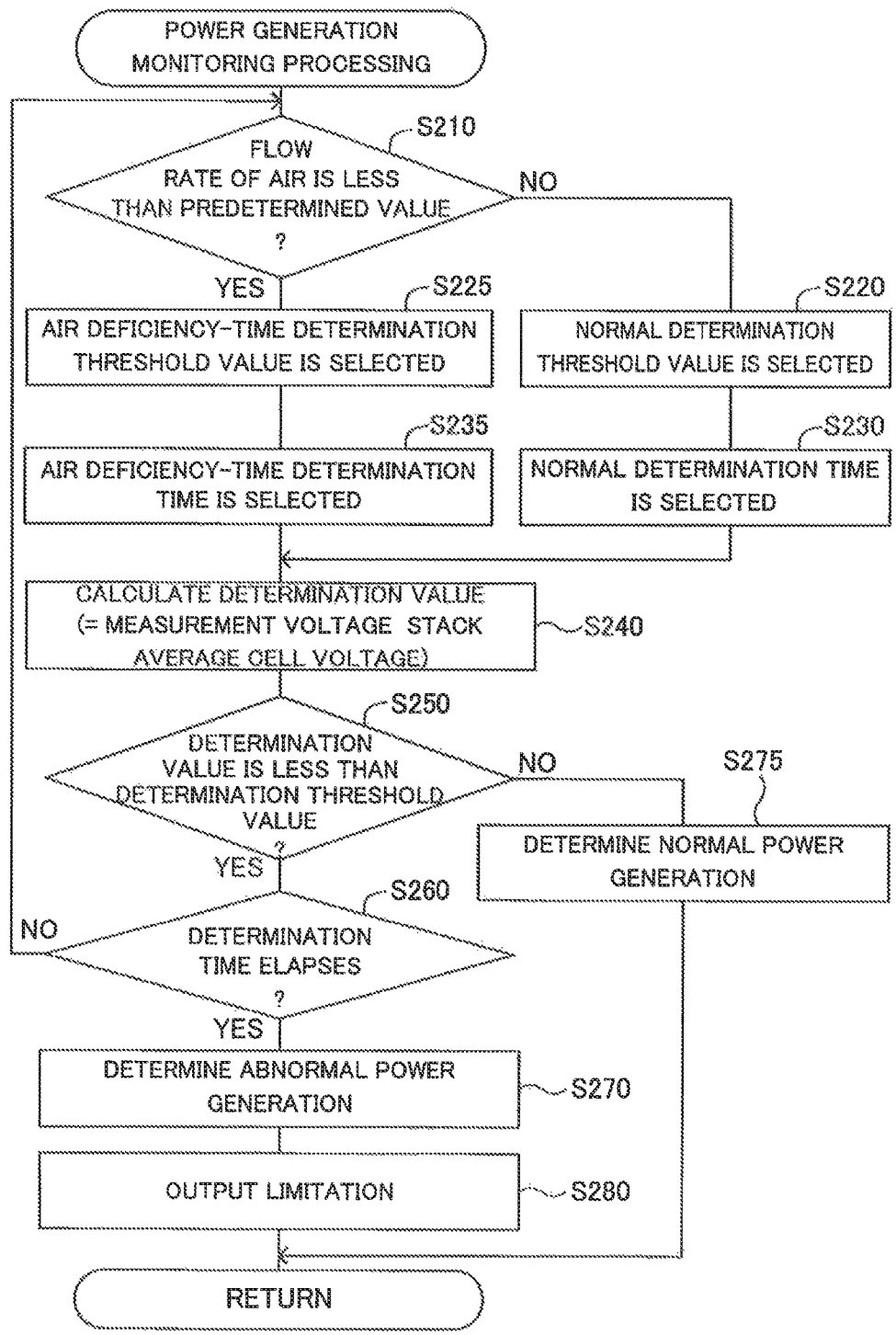
FIG. 4 is a flowchart showing power generation monitoring processing (first embodiment)

FIG. 4 is a flowchart showing the power generation monitoring processing. While power generation is being performed by the fuel cell 100, the power generation monitoring processing is repeatedly performed by the controller 80. More specifically, the power generation monitoring processing is performed by one ECU included in the controller 80. This ECU performs the power generation monitoring processing, and thereby functions as a power generation monitoring device for realizing a power generation monitoring method.

The determiner 82 first determines whether or not the flow rate of air is less than a predetermined value (for example, 1000 NL (Normal Liter)) (step S210). The flow rate of air is calculated from the temperature of the atmosphere, a measurement voltage by the pressure meter 65, the number of revolutions of the air compressor 62 and the like. When the flow rate of air is equal to or more than the predetermined value (no in step S210), a normal determination threshold value (for example, −0.2 V) is selected as a normal threshold value (step S220), and then a normal determination time (for example, 2 seconds) is selected (step S230). The "normal" here means that at least air deficiency (which will be described later) does not occur.

The determination threshold value and the determination time described above are parameters that are used in steps (steps S250 and S260 which will be described later) for detecting an abnormality in the power generation.

On the other hand, when the flow rate of air is less than the predetermined value (yes in step S210), an air deficiency-time determination threshold value (for example, −1.0 V) is selected as a deficiency-time threshold value (step S225). The air deficiency-time determination threshold value is less than the normal determination threshold value. Then, an air deficiency-time determination time (for example, 5 seconds) is selected (step S235). The air deficiency-time determination time is longer than the normal determination threshold value. The air deficiency will then be described.

Figure 5:
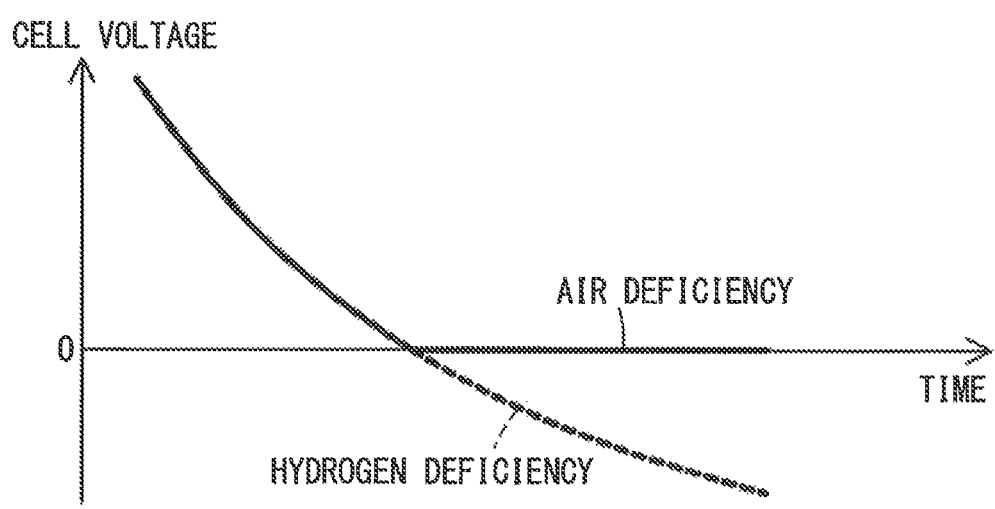
FIG. 5 is graph showing variations in the cell voltage when hydrogen deficiency and air deficiency progress.

FIG. 5 is a graph schematically showing variations in the cell voltage both when hydrogen deficiency occurs and when air deficiency occurs. The hydrogen deficiency is the deficiency of an anode gas, and means that hydrogen is deficient as compared with a necessary amount for a normal power generation reaction in the cell 140. The air deficiency is the deficiency of a cathode gas, and means that oxygen is deficient as compared with a necessary amount for the normal power generation reaction in the cell 140. When the hydrogen deficiency progresses, as shown in FIG. 5, a negative voltage is produced. On the other hand, even when the air deficiency progresses, zero volts are simply maintained, and no negative voltage is produced.

Thus, even when the determination value Vd described together with FIG. 3 is a negative value, if this is caused by air deficiency, as shown in the (D) of FIG. 3, it is highly likely that no negative voltage is produced. Hence, parameters used in steps for detecting the production of a negative voltage are switched depending on whether or not it is highly likely that it is caused by air deficiency. Step S210 described previously is a determination step for realizing this switching and for detecting the occurrence of air deficiency. When the flow rate of air is low, the discharge of moisture by the cathode is insufficient, and even when a stoichiometric ratio is sufficient, air deficiency easily occurs in part of the cells.

As described above, the determination threshold value and the determination time are selected, and thereafter the determination value Vd is calculated (step S240). As described together with FIG. 3, the determination value Vd is the result of comparison between the measurement voltage and the stack average cell voltage Vm, and specifically, is calculated by (measurement voltage−stack average cell voltage Vm).

Then, a determination by comparison between the determination value Vd and the determination threshold value is made, and specifically, whether the determination value Vd is less than the determination threshold value is determined by the determiner 82 (step S250). As described previously, the determination threshold value is selected in any one of step S220 and step S225. For example, in a case where the stack average cell voltage is 0.7 V, when the determination threshold value is the normal determination threshold value of −0.2 V, if the measurement voltage is less than 0.5 V, the determination value Vd is determined to be less than the determination threshold value.

On the other hand, for example, in a case where the stack average cell voltage is 0.7 V, when the determination threshold value is the air deficiency-time determination threshold value of −1.0 V, if the measurement voltage is less than −0.3 V, the determination value Vd is determined to be less than the determination threshold value. Hence, when the measurement voltage is less than −0.3 V or is equal to or more than 0.5 V, the determination result does not depend on whether the determination is made at the time of air deficiency or in a normal time. By contrast, when the measurement voltage is equal to or more than −0.3 V but less than 0.5 V, the determination result depends on whether the determination is made at the time of air deficiency or in a normal time.

When the determination value Vd is less than the determination threshold value (yes in step S250), whether the determination time has elapsed is determined (step S260). The "determination time has elapsed" means that the determination time selected in step S230 or step S235 has elapsed with respect to the time when the initial step of step S250 is performed.

When the determination time has not elapsed (no in step S260), the process returns to step S210, and the processing until step S250 is performed again. When the state where the determination value Vd is less than the determination threshold value is continued, while steps S210 to S250 are being repeated, the determination time has elapsed (yes in step S260). In this case, the determiner 82 determines that the power generation is abnormal (step S270), an output limitation is performed (step S280) and the power generation monitoring processing is completed. The abnormal power generation described above refers to the production of a negative voltage.

The output limitation described above is that a limitation is performed such that generated power in the fuel cell 100 does not exceed an upper limit value. The upper limit value is less than an upper limit value set in a normal time. These measures are taken to reduce the degradation of the cells 140 caused by a negative voltage.

On the other hand, when before the elapse of the determination time, the determination value Vd reaches the determination threshold value or above (no in step S250), the determiner 82 determines that the power generation is normal (step S275), and the power generation monitoring processing is completed. In other words, it is determined that the output limitation is not necessary. This determination is made because since when the determination value Vd is equal to or more than the determination threshold value, it is estimated that hydrogen deficiency does not occur, as compared with the reduction of the degradation of the cells, the acquisition of the output is prioritized.

In the first embodiment described above, at least the following effects can be obtained.

The accuracy of the determination when air deficiency occurs is enhanced. This is because when air deficiency is detected, as compared with a normal case, criteria (the determination threshold value and the determination time) for determining that the power generation is abnormal are alleviated.

Since the determination value Vd is not changed regardless of whether or not air deficiency occurs, a processing load is reduced.

Since as the determination value Vd, a value obtained by subtracting the stack average cell voltage Vm from the measurement voltage is adopted, it is easy to detect abnormal power generation occurring in part of the cells.

With the determination method using the determination time, an erroneous determination caused by disturbance is reduced.

Figure 6:
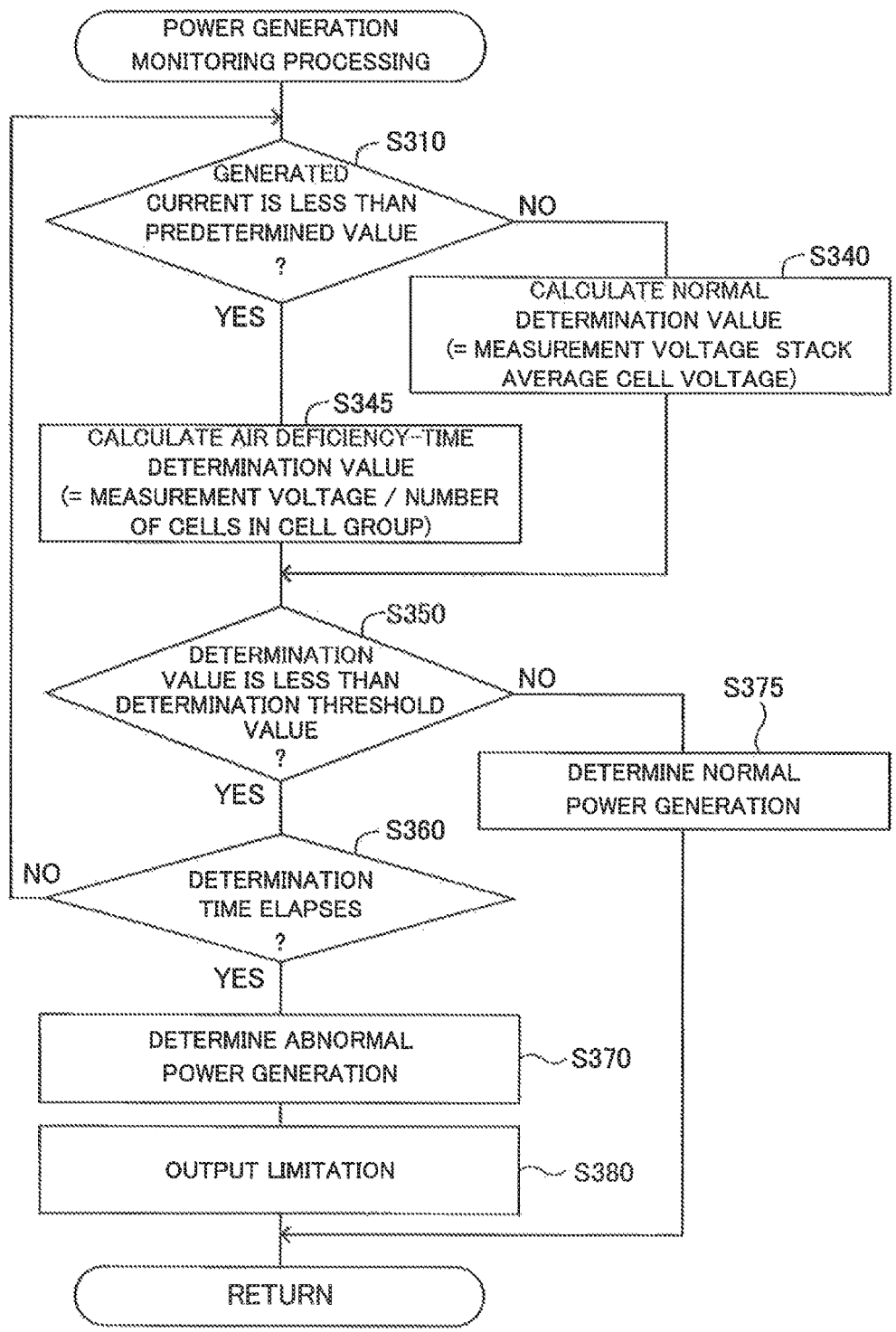
FIG. 6 is a flowchart showing power generation monitoring processing (second embodiment.).

A second embodiment will be described. When the second embodiment is compared with the first embodiment, the second embodiment is the same as the first embodiment in the hardware configuration but differs in the details of the power generation monitoring processing. FIG. 6 is a flowchart showing the power generation monitoring processing in the second embodiment.

When the power generation monitoring processing is started, the determiner 82 determines whether the value of the generated current acquired from the ammeter 89 is less than a predetermined value (for example, 50 A) (step S310). As with step S210 in the first embodiment step S310 is a determination step for detecting the occurrence of air deficiency. When the value of the generated current is decreased, the flow rate of air for acquiring an appropriate stoichiometric ratio is decreased. Consequently, as described in the first embodiment, air deficiency easily occurs.

When the value of the generated current is equal to or more than the predetermined value (no in step S310), a normal determination value Vd is calculated (step S340). The normal determination value Vd refers to a value that is calculated as the determination value Vd in the first embodiment is calculated. Specifically, the normal determination value Vd is calculated by (measurement voltage−stack average cell voltage Vm). The normal determination value Vd is a comparison result. The stack average cell voltage Vm is a representative voltage value in the present embodiment.

On the other hand, when the value of the generated current is less than the predetermined value (yes in step S310), an air deficiency-time determination value Vk is calculated (step S345). The air deficiency-time determination value Vk is calculated by (measurement voltage/number of cells forming the cell group). In other words, the air deficiency-time determination value Vk is the average cell voltage of the cells 140 forming the cell group, and is an estimation value that is calculated based on the measurement voltage. Hereinafter, this value is also referred to as a group average cell voltage. The group average cell voltage in the second embodiment is calculated by (measurement voltage/2).

After the calculation of the determination value Vk, the determiner 82 determines whether the determination value Vk is less than the determination threshold value (step S350). In the second embodiment, the determination threshold value is a fixed value (for example, −0.2 V). In the case of air deficiency, for example, when the determination threshold value is −0.2 V, if the measurement voltage is less than −0.4 V, the determination value Vk is determined to be less than the determination threshold value. On the other hand, in the normal case, for example, when the determination threshold value is −0.2 V, and the stack average cell voltage is 0.7 V, if the measurement voltage is less than 0.5 V, the determination value Vd is determined to be less than the determination threshold value. Hence, when the measurement voltage is less than −0.4 V or is equal to or more than 0.5 V, the determination result does not depend on whether the determination is made at the time of air deficiency or in a normal time. By contrast, when the measurement voltage is equal to or more than −0.4 V but less than 0.5 V, the determination result depends on whether the determination is made at the time of air deficiency or in a normal time.

When the determination value Vk is less than the determination threshold value (yes in step S350), whether the determination time has elapsed is determined (step S360). In the second embodiment, the determination time is a fixed value (for example, 2 seconds).

When the determination time has not elapsed (no in step S360), steps S310 to S350 are repeated. When determination time has elapsed (yes in step S360), as in the first embodiment, the determiner 82 determines that the power generation is abnormal (step S370), the output limitation is performed (step S380) and the power generation monitoring processing is completed.

On the other hand, when before the elapse of the determination time, the determination value Vk reaches the threshold value or above (no in step S350), the determiner 82 determines that the power generation is normal (step S375), and the power generation monitoring processing is completed.

In the second embodiment described above, at least the following effects can be obtained.

The accuracy of the determination when air deficiency occurs is enhanced. This is because when air deficiency is detected, a determination method of comparing the group average cell voltage with the determination threshold value is adopted. When air deficiency occurs, it is unlikely that a negative voltage is produced. Hence, when air deficiency occurs, a method of determining whether or not the group average cell voltage itself is a value (less than −0.2 V) that indicates the production of a negative voltage is adopted, and thus it is possible to achieve both the alleviation of the criteria and the enhancement of the accuracy of the determination as compared with the determination method with consideration given to the stack average cell voltage.

Since the determination threshold value and the determination time are not changed regardless of whether or not air deficiency occurs, a processing load is reduced.

The present invention is not limited to the embodiment, examples and variations in the present specification, and can be realized in various configurations without departing from the spirit thereof. For example, the technical features of the embodiment, examples and variations corresponding to the technical features in the aspects described in the section of Summary of the Invention can be replaced or combined as necessary so that part or the whole of the problem describe previously is solved or part or the whole of the effects described previously is achieved. When the technical features are not described as necessary features in the present specification, they can be deleted as necessary. For example, the followings will be illustrated.

As the method of determining whether or not air deficiency occurs, various methods other than the two methods (steps S210 and S310) disclosed in the first and second embodiments can be considered. For example, in the case of (a), (b) or (c) below, it may be determined that air deficiency occurs. Only any one of the determination methods of (a), (b) and (c) may be used or a plurality of conditions may be combined. When a plurality of conditions are combined, at least any one of the methods in the first and second embodiments may be combined. As the method of combination, any method such as AND conditions or OR conditions may be used.

(a) a case where the number of revolutions of the circulation pump of the anode system is equal to or more than a predetermined value (for example, 500 rpm), (b) a case where drain from the cathode is inhibited by the position (inclination) of an automobile on which the fuel cell system is mounted and (c) a case where drain from the cathode is inhibited by the acceleration of an automobile on which the fuel cell system is mounted.

With respect to the above (a), that the number of revolutions of the circulation pump of the anode system is equal to or more than a predetermined value indicates that it is highly likely that hydrogen deficiency does not occur. Hence, the above (a) can be used as a criterion which indicates that air deficiency may occur.

With respect to the above (b) and (c), the example, in the first and second embodiments, the fuel cell is mounted such that the direction of the drain is the backward direction of the forward and backward directions of the automobile. In such a case, when the rear of the automobile is higher than the front, the drain is inhibited. Alternatively, when an acceleration in the backward direction of the forward and backward directions of the automobile reaches a predetermined value (for example, 0.5 G or more), the drain is inhibited.

When air deficiency occurs, any one of the determination value, the determination threshold value and the determination time may be changed or a combination of two or more thereof may be changed. For example, when as in the second embodiment, the determination value is changed based on whether or not air deficiency occurs, the determination threshold value may be changed.

When air deficiency occurs, the detection of abnormal power generation may be stopped.

The air deficiency-time determination value described in the second embodiment may not be divided by the number of cells included in the cell group, and may be, for example, the measurement voltage itself. When the measurement voltage itself is used as the determination value, the determination threshold value may be changed. For example, in the second embodiment, the determination threshold value may be doubled so as to be −0.4 V. Even if the configuration described above is adopted, the determination method at the time of air deficiency substantially remains the same.

The determination threshold value compared with the air deficiency-time determination value described in the second embodiment may be zero volts or a positive value.

The determination value in the first embodiment and the normal determination value in the second embodiment may not be a value obtained by subtracting the stack average cell voltage from the measurement voltage. For example, instead of the stack average cell voltage, the average cell voltage for part of the cells (for example, half the total cells) may be used. Alternatively, a ratio between the measurement voltage and the stack average cell voltage may be used.

As long as a plurality of cells form the cell group, the number of cells is not limited.

A cell that does not form the cell group may be included. A cell in which a voltage is measured every cell may be included.

The number of cells forming the cell group may not be the same.

A cell whose voltage is not measured may be included.

The main member that performs the power generation monitoring processing may not be one ECU, and may be a plurality of ECUs (control devices). In other words, a plurality of ECUs may communicate with each other to perform the power generation monitoring processing in a coordinated manner.

The application of the fuel cell does not need to be one for an automobile, and may be mounted on another transportation device (such as a motorcycle or a train) or may be installed.

In the embodiment described above, at least part of the function and processing realized by software may be realized by hardware. At least part of the function and processing realized by hardware may be realized by software. Examples of the hardware that can be used include an integrated circuit, a discrete circuit, a circuit module obtained by combining those circuits and various types of circuits (circuitry).

What is claimed is:

1. A fuel cell system comprising:
    an acquirer that acquires a total value of cell voltages of two or more cells included in a fuel cell; and
    a determiner configured to:
        determine, when the total value is a first voltage value, abnormal power generation in which power generation by at least a part of the two or more cells is abnormal,
        determine, when the total value is a second voltage value higher than the first voltage value, normal power generation in which power generation by the two or more cells is normal and
        determine, when the total value is a third voltage value higher than the first voltage value but lower than the second voltage value, the normal power generation if a cathode gas is deficient or the abnormal power generation if the cathode gas is not deficient.

2. The fuel cell system according to claim 1,
    wherein if the cathode gas is deficient, the determiner determines whether power generation is the normal power generation or the abnormal power generation by comparing an estimation value of the cell voltage calculated as a determination value based on the total value with a deficiency-time threshold value.

3. The fuel cell system according to claim 2,
    wherein if the cathode gas is not deficient, the determiner determines whether power generation is the normal power generation or the abnormal power generation by comparing, with a normal threshold value, a result of comparison of the total value with a representative voltage value indicating a state of power generation of the fuel cell as a determination value.

4. The fuel cell system according to claim 3, wherein the deficiency-time threshold value is equal to the normal threshold value.

5. The fuel cell system according to claim 3, wherein if the cathode gas is not deficient, the determiner determines the abnormal power generation when the determination value continues to be lower than the normal threshold value for a predetermined time.

6. The fuel cell system according to claim 5, where in if the cathode gas is deficient, the determiner determines the abnormal power generation when the determination value continues to be lower than the deficiency-time threshold value for a time longer than the predetermined time.

7. The fuel cell system according to claim 3, wherein the result of the comparison is a difference obtained by subtracting the representative voltage value from the total value.

8. The fuel cell system according to claim 3, wherein the representative voltage value is a value obtained by averaging the cell voltages of all the cells included in the fuel cell.

9. The fuel cell system according to claim 1, wherein if the cathode gas is deficient, the determiner determines whether power generation is the normal power generation or the abnormal power generation by comparing, with a deficiency-time threshold value, a result of comparison of the total value with a representative voltage value indicating a state of power generation of the fuel cell as a determination value.

10. The fuel cell system according to claim 9, wherein if the cathode gas is not deficient, the determiner determines whether power generation is the normal power generation or the abnormal power generation by comparing the determination value with a normal threshold value.

11. The fuel cell system according to claim 1, wherein the determiner determines, based on a flow rate of the cathode gas, whether or not the cathode gas is deficient.

12. The fuel cell system according to claim 1, wherein the determiner determines, based on a generated current, whether or not the cathode gas is deficient.

13. A power generation monitoring method comprising:
acquiring a total value of cell voltages of two or more cells included in a fuel cell; and
determining, when the total value is a first voltage value, abnormal power generation in which power generation by at least a part of the two or more cells is abnormal,
determining, when the total value is a second voltage value higher than the first voltage value, normal power generation in which power generation by the two or more cells is normal and
determining, when the total value is a third voltage value higher than the first voltage value but lower than the second voltage value, the normal power generation if a cathode gas is deficient or the abnormal power generation if the cathode gas is not deficient.

14. The power generation monitoring method according to claim 13, wherein if the cathode gas is deficient, whether power generation is the normal power generation or the abnormal power generation is determined by comparing an estimation value of the cell voltage calculated as a determination value based on the total value with a deficiency-time threshold value.

15. The power generation monitoring method according to claim 14, wherein if the cathode gas is not deficient, whether power generation is the normal power generation or the abnormal power generation is determined by comparing, with a normal threshold value, a result of comparison of the total value with a representative voltage value indicating a state of power generation of the fuel cell as a determination value.

16. The power generation monitoring method according to claim 15, wherein the deficiency-time threshold value is equal to the normal threshold value.

17. The power generation monitoring method according to claim 15, wherein if the cathode gas is not deficient, the abnormal power generation is determined when the determination value continues to be lower than the normal threshold value for a predetermined time.

18. The power generation monitoring method according to claim 17, wherein if the cathode gas is deficient, the abnormal power generation is determined when the determination value continues to be lower than the deficiency-time threshold value for a time longer than the predetermined time.

19. The power generation monitoring method according to claim 13, wherein if the cathode gas is deficient, whether power generation is the normal power generation or the abnormal power generation is determined by comparing, with a deficiency-time threshold value, a result of comparison of the total value with a representative voltage value indicating a state of power generation of the fuel cell as a determination value.

20. The power generation monitoring method according to claim 19, wherein if the cathode gas is not deficient, whether power generation is the normal power generation or the abnormal power generation is determined by comparing the determination value with a normal threshold value.

* * * * *